United States Patent [19]

Itzkan

[11] 3,889,208

[45] June 10, 1975

[54] SUPERFLUORESCENT LASER WITH IMPROVED BEAM DIVERGENCE AND SPACIAL BRIGHTNESS

[75] Inventor: Irving Itzkan, Boston, Mass.

[73] Assignee: Avco Everett Research Laboratory, Inc., Everett, Mass.

[22] Filed: Dec. 26, 1973

[21] Appl. No.: 427,441

[52] U.S. Cl.................. 331/94.5 G; 331/94.5 C
[51] Int. Cl................................................ H01s 3/08
[58] Field of Search................... 331/94.5; 330/4.3

[56] References Cited
UNITED STATES PATENTS
3,633,127  1/1972  Caristi et al.............. 331/94.5 PE OTHER PUBLICATIONS
Chester, Mode Selectivity and Mirror Misalignment Effects in Unstable Laser Resonators, App. Opt., Vol. 11, No. 11, (Nov. 1972), pp. 2584-2589.

Anan'ev Unstable Resonators and Their Applications (Review), Soviet J. Quant. Elect., Vol. 1, No. 6, (May–June 1972), pp. 565-586.

*Primary Examiner*—William L. Sikes
*Attorney, Agent, or Firm*—Charles M. Hogan, Esq.; Melvin E. Frederick, Esq.

[57] ABSTRACT

A pulsed superfluorescent laser wherein the pulse time is short compared to the transit time for several laser lengths in terms of the speed of light, and the addition of an optically resonant cavity is ineffective to either produce laser action or increase output power, having an unstable optical resonator effective to reduce beam divergence and increase spacial brightness.

13 Claims, 4 Drawing Figures

SUPERFLUORESCENT LASER WITH IMPROVED BEAM DIVERGENCE AND SPACIAL BRIGHTNESS

This invention relates to superfluorescent lasers and in particular to self-terminating short pulse lasers having an unstable optical resonator.

Superfluorescent lasers of the type here concerned are described in considerable detail in U.S. Pat. No. 3,553,603 issued Jan. 5, 1971; U.S. Pat. No. 3,633,127 issued Jan. 4, 1972; and an article entitled "The 5401A Pulsed Neon Laser" by Donald A. Leonard published in IEEE Journal of Quantum Electronics, Vol. QE-3, March, 1967, pp, 134–135 to which reference is made and hereby incorporated by reference.

The term "superfluorescent" as used herein is synonomous with the term "superradiant" as used in the above-noted references and means the condition whereby a lasing medium, or a medium with a sufficient population inversion, has so much gain that it will self-oscillate without an optical resonator, the oscillation being initiated by spontaneous emission or some other noise source. Thus, pulsed superfluorescent lasers having a sufficiently "short pulse" have so much gain that they self-oscillate. The term short pulse as used herein is one that is short compared to the transit time for several laser lengths in terms of the speed of light. Thus, under these circumstances, an optical resonator or cavity is useless because to be so, there must be several reflections to provide adequate gain.

In the aforementioned exemplary lasers which utilize a crossfield geometry, electric power flows from a capacitor charged by a conventional high voltage source through a discharge circuit to an upper electrode which extends the length of the active region or cavity. An U-shaped channel serves both as structural support for the device and as the other electrode. The discharge takes place along dielectric side walls. On the short time scale required by these lasers, the initial current distribution is essentially inductance controlled providing extremely uniform discharges along the length of the channel.

Thus, the 3371A nitrogen laser and the 5401A neon laser are superfluorescent transient self-terminating systems wherein fast excitation is an explicit requirement for achieving population inversion.

Heretofore, minimum beam divergence in superfluorescent lasers was believed obtainable only by providing a mirror at one end of the lasing region (beam divergence being reduced by one-half in comparison with that of a beam being emitted from both ends of the lasing region) and by providing rough non-reflecting side walls to provide a divergence angle substantially equal to the channel width divided by the channel length. Another and far more expensive prior art technique for improving the beam divergence and spacial brightness of such superfluorescent lasers is to use two such lasers in an oscillatoramplifier configuration with a spacial filter disposed between them.

Further, whereas it is well-known to improve the beam divergence and spacial brightness of the output beam of nonsuperfluorescent high Fresnel number, high gain lasers (the aforementioned pulsed nitrogen laser is a high Fresnel number, high gain superfluorescent laser), this technique heretofore was believed inapplicable to superfluorescent lasers such as the noted pulsed nitrogen lasers and the like because of the short pulse width of these lasers. See, for example, U.S. Pat. No. 3,622,910 wherein it is taught that the pulse width is self-terminating on a time scale which precludes a resonant cavity mode of operation. If, as taught by the prior art, short pulse superfluorescent lasers not only do not require a resonant cavity for operation, but have a self-terminating pulse width on a time scale which precludes a resonant cavity mode of operation, one would, as evidenced by the prior art, certainly conclude that no advantage is to be gained by the provision of an unstable as well as a stable resonant cavity. However, I have provided an aforementioned prior art pulsed superfluorescent nitrogen laser with an unstable resonator and demonstrated that while the addition of an unstable resonator did not result, as expected, in a decrease in output power, it did surprisingly provide both improved beam divergence and spacial brightness.

In accordance with the present invention, there is provided a superfluorescent short pulse laser having an unstable optical resonant cavity comprising a focusing mirror and a small feedback mirror to provide a short pulse superfluorescent laser having, as compared to prior art short pulse superfluorescent lasers, improved beam divergence and spacial brightness without any substantial decrease in beam power thereby permitting the output beam of such a device to be focused to very small spots approaching the dimensions of the wavelength of light and to be propagated for very long distances with a minimum of diffraction spreading.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
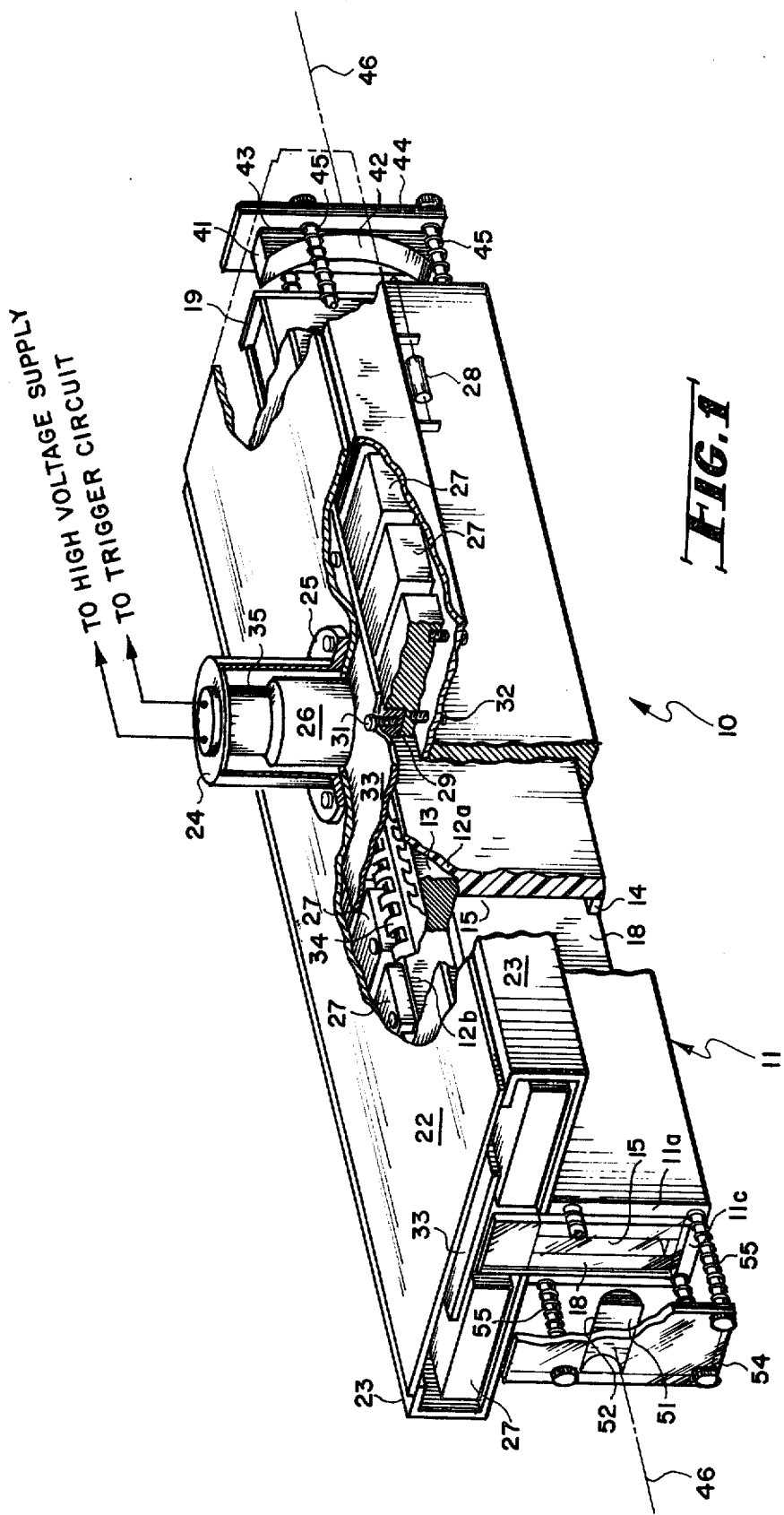
FIG. 1 is a perspective view of a superfluorescent laser in accordance with the invention.

Referring to the drawings, especially FIG. 1, there is shown a laser device generally designated by the numeral 10 which may be attached to and enclosed within a protective enclosure (not shown). The device 10 comprises a base 11 which may be attached to the aforementioned enclosure.

The base 11 is a U-shaped member fabricated from any suitable conducting material, such as aluminum, having two side portions 11a and 11b and an interconnecting bight or bottom portion 11c. Within base 11, which also functions as an electrode, there is disposed a pair of sidewalls 12a and 12b fabricated of a suitable insulating material such as quartz or Pyrex glass. The outermost portions of sidewall members 12a and 12b have a relatively thin upwardly extending flange. An electrode member 13 formed of aluminum or the like is supported by the sidewalls and disposed between the aforementioned upwardly extending flanges of sidewall members 12a and 12b. In addition to being supported in an interfitting engagement between the sidewalls, the electrode member 13 serves to maintain the sidewalls in spaced relation and the flanges of members 12a and 12b prevent arcing between electrode member 13 and base 11. A plurality of spacers 14 or a stepped portions within the base 11 may be provided to maintain the lower portions of the sidewalls in spaced relationship. The space thus provided between the sidewalls defines a relatively thin generally rectangular elongated lasing or working region 15 extending from adjacent one end of the laser device 10 to the opposite end thereof.

A pair of gas feeder tubes may be provided in the bottom portion 11c of the base 11 and provide gas inlet and outlet passages through the bottom portion 11c to permit a gas to be flowed through the lasing or working region 15.

A transparent panel 18 is sealably disposed at the outlet end of the cavity and where mirrors defining an unstable resonator are to be provided exterior of the working region 15, a transparent panel 19 closes the opposite end of the cavity. The panels 18 and 19 may be fabricated from quartz or the like transparent to light at the wavelength of radiation produced in the cavity.

It should be noted here that the working region 15 is generally maintained at a pressure other than atmospheric such as, for example, about 15-25 torr, during the operation of the laser device 10. As is obvious, therefore, it is necessary to pressure seal the means defining the working region 15. The various contacting surfaces between the sidewalls and the base 11, the electrode member 13 and the panels 18 and 19 are therefore sealed by a suitable cement or sealant material to provide at least a relatively gas tight enclosure in the working region 15.

Cover means 22 and rectangular support members 23 extend the entire length of the base 11. A cylindrical member 24 is supported by member 22, said member 24 being attached to said member 22 by toroidal member 25. Members 22, 23, and 24 support and protect the components disposed therein and provide a return path for the discharge current more fully described hereinafter. The support member 23 is attached to and in electrical contact with the base 11 by means of screws so that it may be easily removed for repair purposes.

The electrode member 13 is electrically connected to an energy storage capacitor 26, a plurality of secondary capacitors 27, and a resistor 28 in the following manner. Disposed within the cover means 22 and the support means 23 are a plurality of secondary capacitors 27. The secondary capacitors 27 may be of the conventional type having an upper threaded terminal 29 adapted to receive a screw 31, and a piar of threaded studs 32, one of which (preferably the inner one) is the other terminal. The capacitors 27 are supported on and attached to the member 23 by the threaded studs 32. An electrically conductive plate 33 extending over and covering electrode 13 is supported by and electrically connected to the upper terminal 29 of capacitors 27 by screw 31. A length of spring finger stock 34 extending the length of electrode 13 provides electrical connection between plate 33 and electrode 13. The commercially available mica dielectric energy storage capacitor 26, preferably provided with a threaded terminal at one end (not shown) is typically supported and in electrical contact with plate 33 via the threaded terminal. Disposed above the storage capacitor 26 is switching means 35 such as, for example, a type 1802 hydrogen thyratron manufactured by Edgerton, Germeshausen & Grier, Inc. Storage capacitor and thyratron are disposed in cylindrical member 14; plate 33 being spaced from and electrically insulated from support members 23 and cover means 22. One terminal of the switching means 35 is connected to the nonthreaded terminal of storage capacitor 26, which the opposite terminal of the switching means is connected to the base of the cylindrical member 24.

The secondary capacitors may be arranged in oppositely disposed pairs along the length of the cavity parallel to each other, and in spaced relationship along the length of the channel as shown making, for example, 21 pairs of capacitors over a length of about one meter. Resistor 28 is connected in parallel with the secondary capacitors 27. The secondary capacitors must be of sufficient size to store enough energy to create an inversion in the gaseous lasing medium within the working region 15 when the switching means or thyratron 35 is fired by a trigger circuit 36 (see FIG. 2) which controls the laser repetition rate. The storage capacitor 26 may be commercially available mica dielectric capacitor of sufficient size to store the high-voltage charge required to charge the secondary capacitors 27. The energy storage capacitor 26 is charged from a charging network circuit comprising resistor 37 and inductor 38. The charging network is coupled to a high-voltage supply 39 which provides, for example, 20 kilovolts. The charging network functions to allow the laser device to be operated at a low repetition rate of a single pulse or repetitively up to rates of 100 pulses per second or more. The value of resistor 37 and inductor 38 are chosen to be consistent with the fastest repetition rate at which the circuit is intended to operate. Resistor 37 and inductor 38 also act as isolation elements between the high-voltage source 29 and the balance of the circuit. The resistor 37 used in the preferred embodiment was 250 k$\Omega$ and the inductor 38 was 100 henries.

Figure 3:
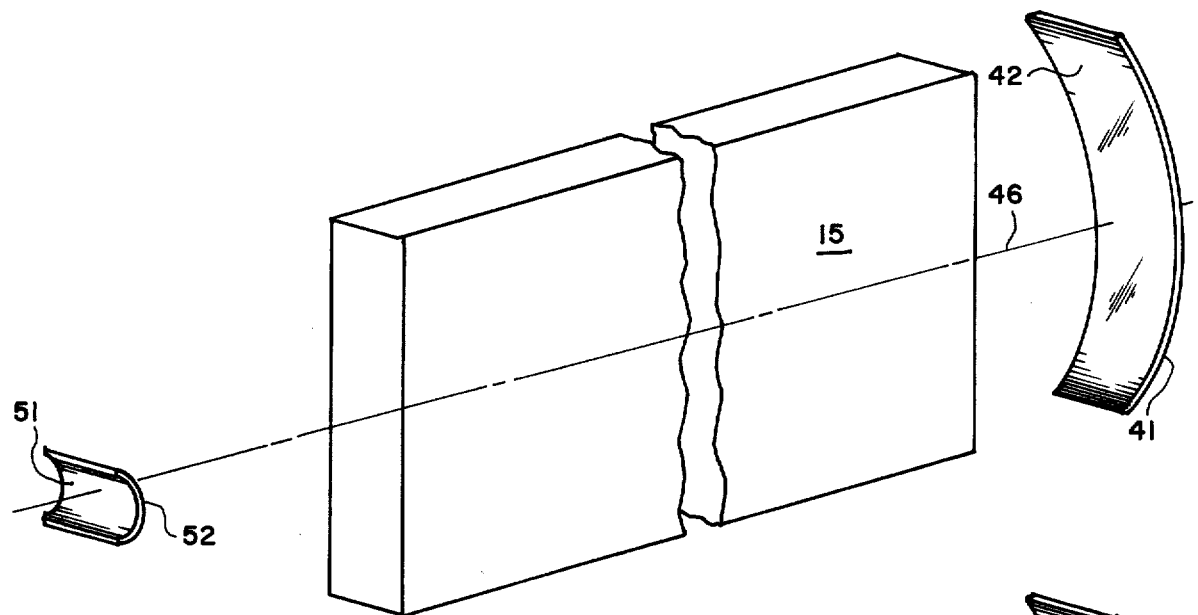
FIG. 3 is a diagrammatic representation of the unstable optical resonator of the laser of FIG. 1 having cylindrical reflective surfaces.

The optically unstable resonant cavity is most simply, conveniently and inexpensively provided by the provision of a focusing mirror adjustably mounted adjacent and exterior of panel 19 and a feedback mirror adjustably mounted adjacent and exterior of panel 18. Thus, as shown in FIGS. 1 and 3, a reflecting mirror 41 having a concave cylindrical reflecting surface 42 of a size preferably slightly greater than that of the cross section of the working region 15 is carried in a holding member 43 attached to mounting plate 44. Mounting plate 44 is adjustably attached to the base 11 in conventional manner by adjusting screws 45 to permit the proper orientation of the mirror with the working region 15.

In like manner, a feedback mirror 51 having a convex cylindrical surface 52 extending across the working region 15 adjacent and exterior of panel 18 is carried in a second holding member 53 attached to a second mounting plate 54. The feedback mirror mounting plate 54 is adjustably attached to the base 11 as by screws 55 to permit proper orientation with both mirror 41 and the optical axis 46 of working region 15 intermediate mirrors 41 and 51.

The manner and technique of adjustably mounting laser mirrors and orientating them to define an optically stable as well as unstable cavity are well-known in the art and will not be further discussed here.

The reflective surfaces of the mirrors are reflective at the wavelength of radiation produced in the working region 15 and fabricated in conventional manner and of suitable material. Thus, the reflective surfaces may be, for example, first aluminized surfaces or dielectric coatings disposed on quartz or Pyrex substrates.

Figure 2:
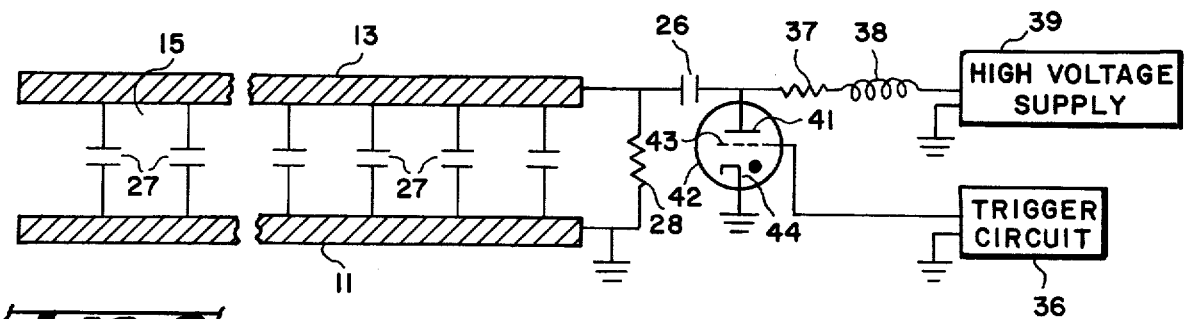
FIG. 2 is a schematic diagram showing the electric circuit employed in the device of FIG. 1.

Referring now to FIG. 2, taken in connection with FIG. 1, it will be seen that a plurality of secondary capacitors 27 substantially equally spaced one from another are coupled in parallel across cavity 15, they being connected in parallel to electrode 13 and base member 11 as shown in FIG. 2 as is resistor 28. The parallel connected secondary capacitors 27 are in turn connected through the energy storage capacitor 26 to the plate 41 of a thyratron 42. The control grid 43 of the thyratron 42 is coupled to a conventional trigger circuit 36 and the cathode 44 of the thyratron 42 is connected to ground as is base member 11. The plate 41 of the thyratron is coupled through a series connected charging network or resistor 37 and inductor 28 to the high-voltage supply 39. The high-voltage supply 39 and trigger circuit 36 are grounded thereby completing the high-voltage and trigger circuits.

The resistance of resistor 28 connected across the working region 15 is chosen to be large compared to the resistance of the gas during discharge and small compared to resistor 37. As previously noted, a suitable thyratron is, for example, a type 1802 hydrogen thyratron manufactured by Edgerton, Germeshausen & Grier, Inc. The energy storage capacitor 26 should, for example, have an inductance of about 5 nanohenries or less, a capacitance of about 12,000 picofarads at 20 kv whereby its stored charge is sufficient to charge the secondary capacitors 27 connected across the working region 15 to the voltage necessary to break down the gas in the working region 15. Capacitors 27 should, of course, as indicated above, have a capacitance such that when the stored charge of storage capacitor 26 is discharged into them by actuation of thyratron 42, they will, in turn, uniformly break down and discharge into the gas working region 15. In a circuit as shown in FIG. 2, if the capacitance of capacitors 27 connected across the working region 15 is zero, the device will not operate satisfactorily, if at all. On the other hand, if these capacitors are sized too large, it is not possible to break down the gas in the working region 15 due to the inability to build up a sufficiently high voltage during each pulse. There is, however, an optimum ratio of the size of the secondary capacitors 27 to the size of the storage capacitor 26. The optimum ratio is about 0.8.

In the laser device 10, the efficiency of the device depends to a great extent on the shortness of the electrical pulses. For example, the radiative lifetime of the upper laser level for nitrogen is about 40 nanoseconds and 10 nanoseconds for neon. Therefore, where the electrical pulse duration is held to a minimum, it is also necessary to keep the inductance to a minimum to permit a significant fraction of the current to be delivered within the length of the laser pulse duration.

The following table summarizes typical performance and characteristics of a superfluorescent nitrogen laser in accordance with the invention.

NITROGEN LASER CHARACTERISTICS

| | |
|---|---|
| Output Wavelength | $\lambda = 3371 A°$ |
| Bandwidth | $\Delta\lambda \leq 1A$ |
| Gain Coefficient | 75 db/meter |
| Efficiency Based on Energy Stored in Capacitor | $\epsilon = 0.05\%$ |
| Beam Divergence in Long | |

NITROGEN LASER CHARACTERISTICS — Continued

| | |
|---|---|
| Dimension of Cavity | $2 \times 10^{-3}$ radians |
| Beam Divergence in Short Dimension of Cavity | $2 \times 10^{-3}$ radians |
| Peak Power | 100 kw |
| Laser Pulse Duration | $10^{-8}$ seconds |
| Energy Per Pulse | 1 millijoule |
| Repetition Rate | 0-100 HERTZ |
| Average Power | 100 milliwatts |
| Gas | Nitrogen |
| Gas Pressure | 20 Torr |
| Width Dimension of Discharge Cavity | 3 millimeters |
| Height Dimension of Discharge Cavity | 50 millimeters |
| Length of Discharge Cavity | 1 meter |
| Length of Optical Cavity | 1.06 meters |
| Concave mirror, radius | 2080 millimeters |
| Convex mirror, radius | 40 millimeters |

Whereas the laser having the above-noted characteristics had a beam divergence of only 2 milliradians in both the long and short dimensions of the cavity, this same laser without the unstable resonator has a beam divergence of respectively 30 milliradians and 2 milliradians.

Attention is directed to the significant fact that the addition of the unstable resonator to the prior art laser did not effectively reduce the output power. This is due to the fact that only a few percent of feedback was found necessary to provide a diffraction limited beam, hence, only a small feedback mirror is required. Since the feedback mirror does obstruct part of the output window, some reduction in power occurs, but it was found to be negligible.

Preferably for a laser cavity of length L, the sum of the radii $R_1$ and $R_2$ of the mirrors comprising the unstable resonator should equal approximately 2L. Thus, if the design criterion $R_1+R_2=2L$ is substantially met, optimum operation in accordance with the invention will be obtained.

Provision of mirrors as described herein in accordance with the invention will provide a generally rectangular diffraction limited beam with a break in the middle caused by the presence of the feedback mirror. The beam will tend to be more intense in bands in the edge portions parallel with the height dimension.

It is to be understood that the present invention is not limited to that described above. It is applicable to all superfluorescent lasers such as, for example, all operable forms of pulsed nitrogen and neon lasers, copper vapor lasers, high gain dye lasers, and all other lasers operating in the superfluorescent mode.

Figure 4:
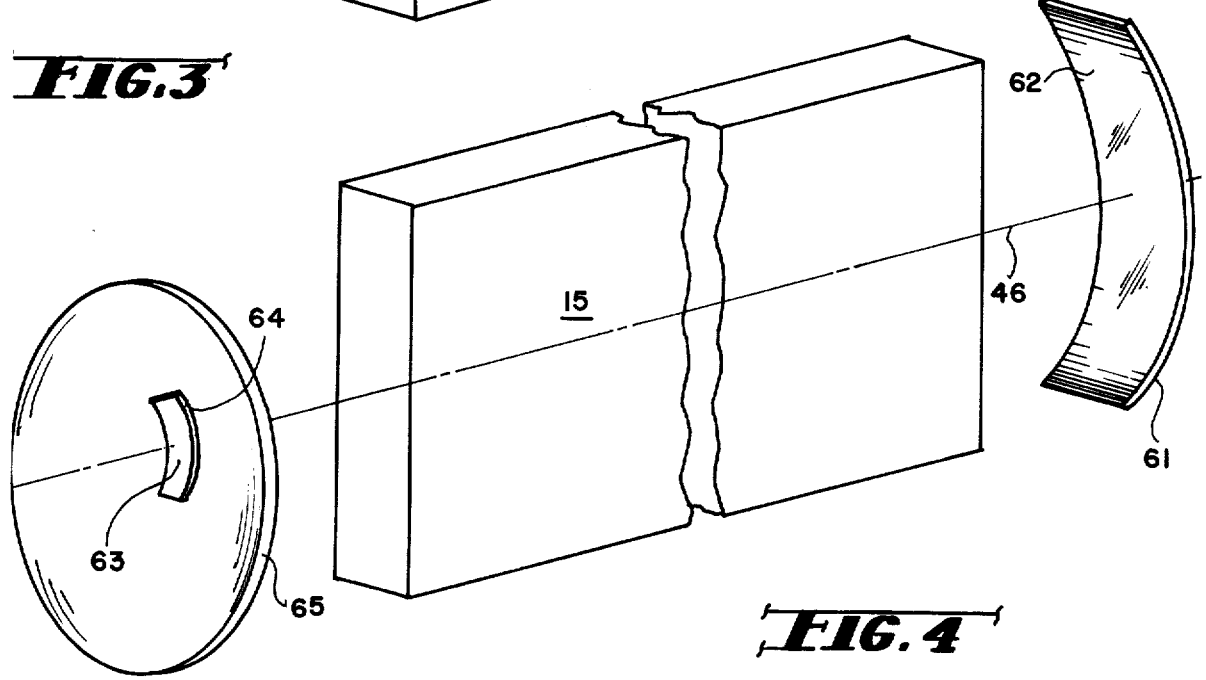
FIG. 4 is a diagrammatic representation of an unstable optical resonator having spherical reflective surfaces.

FIG. 4 illustrates a modified unstable resonator in accordance with the invention utilizing spherical reflective surfaces. Thus, as shown in FIG. 4, a focusing mirror 61 may be provided in conventional manner with a concave spherical reflective surface 62 and may be substituted for mirror 41 of FIG. 3 and a feedback mirror 63 having a convex spherical reflective surface 64 provided in conventional manner may be substituted for mirror 51 of FIG. 3. Reflective surface 64 may be a suitable reflective coating deposited on a transparent supporting structure 65 or the coating may be deposited on a substrate supported by a spider or the like (not shown).

The various features and advantages of the invention are thought to be clear from the foregoing description.

Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In a pulsed superfluorescent laser device having short pulse output pulses of light energy, the combination comprising:
   a. means defining an elongated unstable optically resonant cavity having a longitudinal axis and a predetermined length;
   b. means for supplying to said cavity a gaseous lasing medium having at least two energy levels above the ground energy level in which the net excitation rate for the higher of the two upper levels is greater than the net excitation rate for the lower of the two energy levels by an amount sufficient to provide superfluorescence during electric discharge in said medium;
   c. first and second oppositely disposed electrode means communicating with said cavity for applying an electric field across said cavity normal to and along said longitudinal axis; and
   d. pulse circuit means coupled to said electrode means and adapted to be coupled to a pulsed source of high voltage electrical power for sequentially providing discrete pulses of said electric field in said cavity and sequentially providing discrete superfluorescent inversions between the said two energy levels of said gas, said inversions having a pulse width that is short compared to the transit time of light for several said cavity lengths.

2. A laser device as defined in claim 1 wherein said means defining said cavity comprises a pair of oppositely disposed mirrors and means defining a working region for receiving said gas intermediate said mirrors.

3. A laser device as defined in claim 2 wherein said mirrors are disposed exterior of said means defining said working region.

4. A laser device as defined in claim 3 wherein said means defining said working region includes two oppositely disposed windows transparent to light at the wavelength of radiation produced in said working region, said mirrors being disposed adjacent said windows and in optical alignment.

5. A laser device as defined in claim 2 wherein said gas is nitrogen and said pulse width is about 40 nanoseconds.

6. A laser device as defined in claim 2 wherein said gas is neon and said pulse width is about 10 nanoseconds.

7. A laser device as defined in claim 1 wherein said gas is nitrogen and said means defining said unstable resonant cavity includes a concave cylindrical mirror and a convex cylindrical feedback mirror.

8. A laser device as defined in claim 7 wherein said cavity has a length L and the sum of the radii of said convex and concave mirrors equals about 2L.

9. A laser device as defined in claim 8 wherein said means defining said cavity includes a window transparent to light at the wavelength of radiation produced in said cavity, said feedback mirror being disposed adjacent said window and arranged and adapted to reflect back to said concave mirror only a small portion of the light energy reflected from said concave mirror, the remainder being emitted from said cavity through said window as said output pulses.

10. In a pulsed superfluorescent laser device having self-terminating short pulse output pulses in the range of about 10 to 40 nanoseconds, the combination comprising:
   a. means defining an elongated unstable optically resonant cavity having a longitudinal axis, a predetermined length, and a substantially rectangular cross section defined by a width dimension substantially less than a height dimension, said means comprising a first mirror having a substantially fully reflective concave reflective surface having a predetermined radius and a second mirror having a substantially fully reflective convex feedback surface having a radius substantially less than the radius of said concave surface, said mirrors each having a longitudinal axis normal to said height dimension and normal to and coincident with said cavity longitudinal axis, said means further including a window transparent to light at the wavelength of radiation produced in said cavity, said feedback surface being disposed adjacent said window and said concave surface being disposed at the opposite end of said cavity;
   b. a lasing medium taken from the class consisting of nitrogen and neon;
   c. first and second oppositely disposed electrode means communicating with said cavity for applying an electric field across said cavity normal to and along said longitudinal axis; and
   d. pulse circuit means coupled to said electrode means and adapted to be coupled to a pulsed source of high voltage electrical power for sequentially providing said electric field in said cavity and sequentially providing discrete superfluorescent inversion between the two energy levels of said gas, said inversions having a pulse width that is short compared to the transit time of light for several said cavity lengths.

11. A laser device as defined in claim 10 wherein said concave surface and said convex feedback surfaces are cylindrical in shape.

12. A laser device as defined in claim 10 wherein said concave surface and said convex feedback surfaces are spherical in shape.

13. A laser device as defined in claim 12 wherein said feedback surface is disposed on a transparent supporting member.

* * * * *